United States Patent
Shirayanagi

(10) Patent No.: US 7,341,344 B2
(45) Date of Patent: Mar. 11, 2008

(54) PROGRESSIVE POWER LENS

(75) Inventor: Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 95 days.

(21) Appl. No.: 11/165,371

(22) Filed: Jun. 24, 2005

(65) Prior Publication Data
US 2005/0286015 A1    Dec. 29, 2005

(30) Foreign Application Priority Data
Jun. 25, 2004    (JP)    ............... 2004-188851

(51) Int. Cl.
 *G02C 7/06*    (2006.01)
(52) U.S. Cl. ....................... 351/168; 351/161
(58) Field of Classification Search ................ 351/168, 351/161, 169, 171, 172, 176
See application file for complete search history.

(56) References Cited

U.S. PATENT DOCUMENTS

| 5,926,250 | A | 7/1999 | Mukaiyama et al. |
| 6,019,470 | A | 2/2000 | Mukaiyama et al. |
| 6,712,467 | B1 * | 3/2004 | Kitani ................. 351/169 |
| 6,948,816 | B2 | 9/2005 | Yamamoto et al. |
| 2002/0067462 | A1 * | 6/2002 | Shirayanagi ............ 351/176 |
| 2003/0048408 | A1 * | 3/2003 | Yamamoto et al. ........ 351/159 |
| 2003/0160940 | A1 * | 8/2003 | Welk et al. ............. 351/159 |

FOREIGN PATENT DOCUMENTS

| JP | 2003/279902 | 10/2003 |
| WO | 97/19382 | 5/1997 |

* cited by examiner

*Primary Examiner*—Scott J. Sugarman
*Assistant Examiner*—Darryl J. Collins
(74) *Attorney, Agent, or Firm*—Greenblum & Bernstein, P.L.C.

(57) ABSTRACT

A progressive power lens having a positive vertex power in a distance portion is provided. At least a back surface of the progressive power lens is configured as a progressive surface. The progressive power lens satisfies a condition:

$$Pf + \frac{ADD}{3} < D1 < Pf + ADD \qquad (1)$$

where Pf represents a vertex power in the distance portion along a vertical cross-section, ADD represents an addition power, and D1 represents a surface power of a front surface.

6 Claims, 22 Drawing Sheets

PROGRESSIVE POWER LENS

INCORPORATION BY REFERENCE

This application claims priority of Japanese Patent Application No. 2004-188851, filed on Jun. 25, 2004, the entire subject matter of the application being incorporated herein by reference.

BACKGROUND OF THE INVENTION

The present invention relates to a progressive power lens configured to have positive power in a distance portion and to have a progressive surface formed at least on an back surface (an eye side surface) thereof.

Progressive power lenses have been widely used for correction of presbyopia. In order to secure a high degree of processing flexibility and to secure a wide clear vision area, it is preferable that a progressive power lens is configured such that a progressive surface is formed on a back surface of the lens. An example of such a progressive power lens is disclosed in International publication No. WO 97/19382 (hereafter, referred to as a document 1).

It is preferable that a spectacle lens is formed to be a meniscus lens. Such a view is ascribable to the fact that if a back surface of a spectacle lens is a convex surface, problems as described below may arise. That is, if the spectacle lens is placed on a table while a back surface thereof is downwardly oriented, a central portion of the back surface contacts a top surface of the table. In this case, the central portion of the back surface of the lens may be scratched. Also, in such a case, a skin or body hairs (e.g., eyelashes) of a wearer tend to contact the convex surface, by which the convex surface may be smeared.

For this reason, the spectacle lens disclosed in the document 1 is designed in such a manner that a surface power of an object side surface (front surface) is larger than a sum of a vertex power of a distance portion and an addition power so that a meniscus shape is attained.

However, if the above mentioned design manner is adopted in designing a progressive power lens having a positive power in a distance portion thereof, a thickness of the central portion of the lens becomes large, and thereby the reduction of the lens thickness can not be attained.

SUMMARY OF THE INVENTION

The present invention is advantageous in that it provides an progressive power lens configured such that the lens has a positive power in a distance portion and that the thickness of a central portion there of is small while keeping a meniscus shape.

According to an aspect of the invention, there is provided a progressive power lens having a positive vertex power in a distance portion. At least a back surface of the progressive power lens is configured as a progressive surface. The progressive power lens satisfies a condition:

$$Pf + \frac{ADD}{3} < D1 < Pf + ADD \quad (1)$$

where Pf represents a vertex power in the distance portion along a vertical cross-section, ADD represents an addition power, and D1 represents a surface power of a front surface.

With this configuration, it becomes possible to reduce a thickness at a central portion of the lens while keeping the entire shape of the lens in a meniscus shape.

According to another aspect of the invention, there is provided a progressive power lens having a positive vertex power in a distance portion. At least a back surface of the progressive power lens is configured as a progressive surface. Given that an axis normal to a front surface of the progressive power lens at a prism reference point is defined as a z-axis, an axis which passes through an intersection of the z-axis and the back surface in a vertical direction in a state where the progressive power lens is worn by an wearer is defined as an y-axis, a sag amount which is a distance between a point on a curve, defined as an intersection line of the back surface and an y-z plane, at a height y and the y-axis is represented by z2(y), a curvature of the curve at a height y is represented by C2(y), a height of a distance reference point from the z-axis is represented by yf, a height of a near reference point from the z-axis is represented by yn, a height of a top end of the progressive power lens from the z-axis is represented by yt, and a height of a bottom end of the progressive power lens from the z-axis is represented by yu, the progressive power lens satisfies a following conditions:

$$C2(yf) > 0 \quad (2),$$

$$C2(yn) < 0 \quad (3), \text{ and}$$

$$z2(yt) + z2(yu) > 2 \cdot z2(0) \quad (4),$$

where a direction headed from the front surface to the back surface is defined as a positive direction of the z-axis, and a direction heading for an upper end of the progressive power lens along the vertical direction in a state where a wearer wears the progressive power lens is defined as a positive direction of the y-axis.

With this configuration, it becomes possible to reduce a thickness at a central portion of the lens while keeping the entire shape of the lens in a meniscus shape.

According to another aspect of the invention, there is provided a progressive power lens having a positive vertex power in a distance portion. At least a back surface of the progressive power lens is configured as a progressive surface. The progressive power surface is configured such that a minimum one C2min of two principal curvatures obtained when the back surface is approximated by a toric surface satisfies a condition:

$$0 < C2\min < 2 \quad (5).$$

With this configuration, it becomes possible to reduce a thickness at a central portion of the lens while keeping the entire shape of the lens in a meniscus shape.

Optionally, the back surface may have a property of correcting astigmatism.

Still optionally, the progressive power lens may be provided with an addition power in such a manner that distribution of a vertical component of the addition power among front and back surfaces thereof and distribution of a horizontal component of the addition power among the front and back surfaces are separately defined.

Still optionally, the progressive power lens may be provided with an addition power in such a manner that one of vertical and horizontal components of the addition power is allocated to one of front and back surfaces thereof and the other of the vertical and horizontal components of the addition power is allocated to the other of the front and back surfaces.

Still optionally, the progressive power lens may be provided with an addition power in such a manner that each of vertical and horizontal components of the addition power is distributed among the front and back surfaces thereof.

BRIEF DESCRIPTION OF THE ACCOMPANYING DRAWINGS

Figure 47:
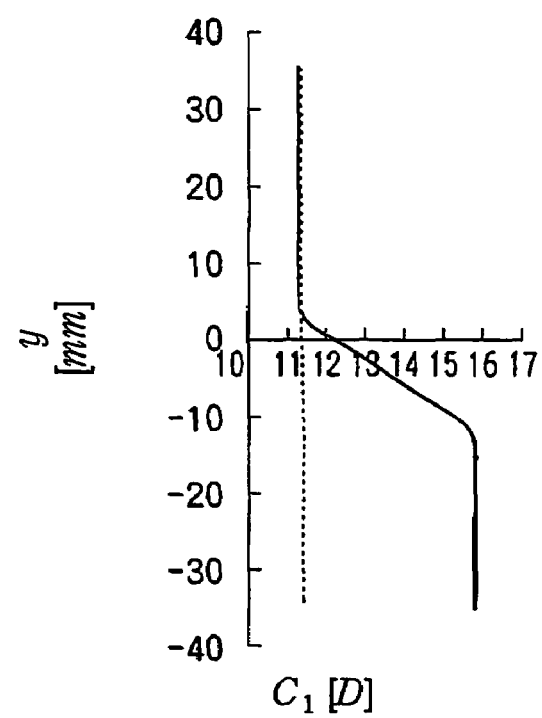
Figure 48:
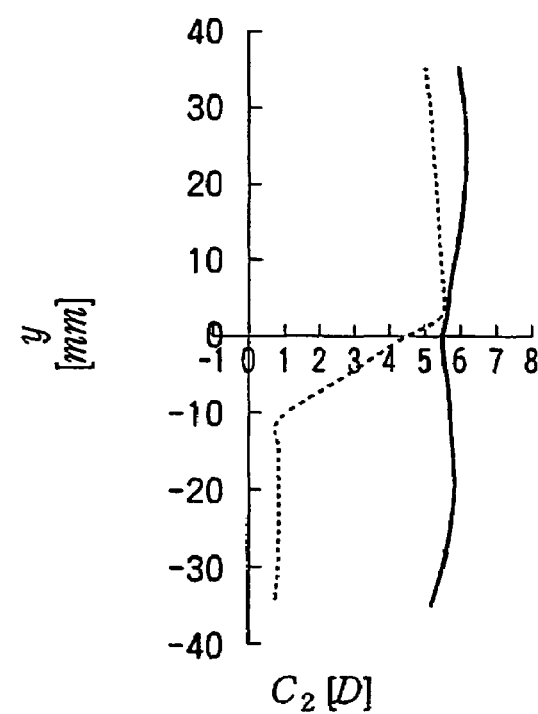

FIG. 47 is a graph illustrating change of a curvature of the front surface of the lens according to the fifth comparative example along a the vertical cross-section, and a sagittal curvature of the front surface; and FIG. 48 is a graph illustrating change of a curvature of the back surface of the lens according to the fifth comparative example along the vertical cross-section, and a sagittal curvature of the back surface.

DETAILED DESCRIPTION OF THE EMBODIMENTS

Hereinafter, an embodiment according to the invention is described with reference to the accompanying drawings.

Figure 1:
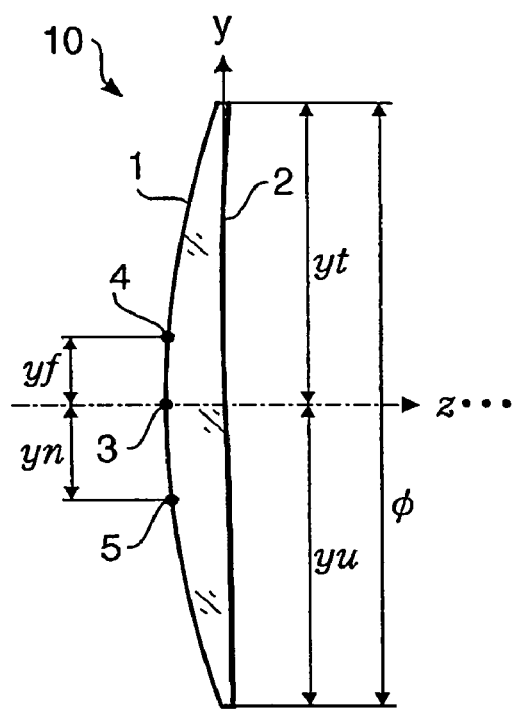
FIG. 1 is a vertical cross-section of a progressive power lens according to an embodiment of the invention.

FIG. 1 is a cross-sectional view of a progressive power lens 10 according to an embodiment of the invention. As shown in FIG. 1, the progressive power lens 10 has a front surface 1 and a back surface 2. The progressive power lens 10 has a positive power in a distance portion thereof. In this embodiment, the front surface 1 is formed to be a spherical surface or a progressive surface, and the back surface 2 is formed to be a progressive surface.

In FIG. 1, an axis normal to the front surface 1 at a prism reference point 3 is defined as a z-axis, an axis which passes through an intersection of the z-axis and the back surface 2 in a vertical direction (which is perpendicular to the z-axis) in a state where a wearer wears the lens 10 is defined as a y-axis. That is, FIG. 1 is a cross-section of the lens 10 along a y-z plane. In FIG. 1, a direction headed from the front surface 1 to the back surface 2 is as a positive direction of the z-axis, and a direction headed from the bottom end of the lens 10 to the upper end of the lens 10 is a positive direction of the y-axis.

In FIG. 1, reference numerals "4" and "5" represent a distance reference point and a near reference point, respectively.

The progressive power lens 10 is configured to satisfy a condition:

$$Pf + \frac{ADD}{3} < D1 < Pf + ADD \qquad (1)$$

where Pf represents a vertex power in the distance portion along a vertical cross-section (i.e. in the y-z plane), ADD represents an addition power, and D1 represents a surface power of the front surface 1.

By satisfying the condition (1), the progressive power lens 10 is formed such that the thickness of the central portion thereof is sufficiently reduced while keeping the entire shape thereof in a meniscus shape. If the surface power D1 of the front surface 1 (i.e., a base curve) gets lower than the lower limit of the condition (1), the lens 10 may become unable to keep its meniscus shape. In this case, the lens 10 tends to be scratched or soiled.

If the surface power D1 of the front surface 1 gets larger than the upper limit of the condition (1), the thickness at the central portion of the lens becomes larger, and therefore the reduction of thickness can not be attained.

In addition to or alternative to satisfying the condition (1), the progressive power lens 10 may be configured to satisfy all of the following conditions (2), (3) and (4).

$$C2(yf) > 0 \qquad (2)$$

$$C2(yn) < 0 \qquad (3)$$

$$z2(yt) + z2(yu) > 2 \cdot z2(0) \qquad (4)$$

In the conditions (2) to (4), $z2(y)$ represents a sag amount which is a distance between a point on a curve (which is defined as an intersection line of the back surface 2 and the y-z plane) at a height y and the y-axis, $C2(y)$ represents a curvature of the curve at a height y, yf represents a height of the distance reference point from the z-axis, yn represents a height of the near reference point from the z-axis, yt represents a height of the top end of the lens 10 from the z-axis, and yu represents a height of the bottom end of the lens 10 from the z-axis.

By satisfying the conditions (2) to (4), the progressive power lens 10 is formed such that the thickness of the central portion thereof is sufficiently reduced while keeping the entire shape thereof in a meniscus shape.

The condition (2) is a condition to be satisfied for keeping at least a shape of a distance portion of a progressive power lens, which has a positive vertex power in the distance portion, in a meniscus shape. If the curvature $C2(yf)$ at the distance reference point does not satisfies the condition (2) (i.e., if the curvature $C2(yf)$ takes a negative value), the back surface 2 of the lens 10 becomes entirely convex.

The condition (3) is a condition for reducing the thickness at a central portion of a progressive power lens. If the curvature $C2(yn)$ at the near reference point does not satisfy the condition (3) (i.e., if the curvature $C2(yn)$ takes a positive value), the base curve becomes excessively large, and therefore the thickness of the lens at the central portion can not be reduced.

The condition (4) defines a relationship between the sag amounts of the upper and bottom ends of the lens 10 and the sag amount on the z-axis. A lens satisfying the condition (4) is configured such that if the lens is placed on a table while a back surface thereof is downwardly oriented, only a periphery of the lens contacts the table. That is, by satisfying the condition (4), a meniscus shape suitable for preventing the back surface from being scratched or soiled can be attained.

In general, with regard to a progressive power lens which is not designed for correction of astigmatism and is configured to have a progressive surface on a back surface or on both of front and back surfaces, a vertical cross section (i.e., a cross-section along the y-z plane) of the back surface is a cross-section that draws a curve having most small curvature of all of the cross-sections (including the z-axis) defined in the lens if the curvature of each cross section is determined according to an approximation by a circular arc. Hereafter, such a cross-section will be frequently referred to as a minimum curvature cross-section. For this reason, each of the above conditions is defined assuming that the vertical cross-section of the back surface 2 of the progressive power lens 10 is the minimum curvature cross-section.

On the other hand, if the progressive power lens is designed to additionally correct astigmatism (i.e., if the progressive power lens is provided with a cylindrical power), a back surface of the progressive power lens is designed to have two properties including a progressive power and correction of astigmatism. In such a progressive power lens, a direction of the minimum curvature cross-section of the back surface changes depending on a direction of a cylinder axis AX. Therefore, the vertical cross-section is not necessarily the minimum curvature cross-section.

Similarly, with regard to a progressive power lens designed such that the distribution of a vertical component of an addition power among front and back surfaces thereof and the distribution of a horizontal component of the addition power among the front and back surfaces are separately defined (including the case where the vertical and horizontal components of the addition power are respectively allocated to the front and back surfaces and the case where each of vertical and horizontal components of the addition power is distributed among the front and back surfaces), a vertical cross-section of the lens is not necessarily the minimum curvature cross-section.

In view of the above mentioned fact, the progressive power lens may be configured as follows. That is, if the progressive power lens 10 is designed to have a cylindrical power or the progressive power lens 10 is designed such that the distribution of a vertical component of the addition power among the front and back surfaces 1 and 2 and the distribution of a horizontal component of the addition power among the front and back surfaces 1 and 2 are separately defined, then the vertical cross-section is not necessarily the minimum curvature cross-section. Therefore, in this embodiment the progressive power lens 10 is configured such that minimum one (a minimum curvature C2min) of two principal curvatures, obtained when the back surface 2 is approximated by a toric surface, satisfies a condition (5):

$$0 < C2min < 2 \quad (5).$$

By satisfying the condition (5), it becomes possible to reduce the thickness of the lens 10 while keeping its meniscus shape even if the lens 10 is designed such that the vertical cross-section is not necessarily the minimum curvature cross-section.

If the curvature C2min gets lower than the lower limit of the condition (5), the lens 10 can not keep the meniscus shape (i.e., the back surface 2 may become undesirably a convex surface). If the curvature C2min gets larger than the upper limit of the condition (5), it becomes impossible to reduce sufficiently the thickness of the lens 10.

An example of a manner for approximating a surface by a toric surface is as follows. First, a function representing a sag amount of a toric surface which has principal cross-sections along the x-axis and y-axis is defined as:

$$f(x,y; rx, ry)$$

where rx represents a principal radius of curvature of the principal cross-section along the x-axis, and ry represents a principal radius of curvature of the principal cross-section along the y-axis. Second, parameters representing coordinate conversion are defined as ($\alpha$, $\beta$, $\gamma$, $\Delta x$, $\Delta y$, $\Delta z$). First three parameters $\alpha$, $\beta$ and $\gamma$ represent the rotating amount of the toric surface, and subsequent three parameters $\Delta x$, $\Delta y$ and $\Delta z$ represent the shifting amount of the toric surface. A function representing a sag amount of the toric surface which has been subjected to the coordinate conversion with respect to the coordinate (x,y) using the parameters is defined as indicated below.

$$F(x,y; rx, ry, \alpha, \beta, \gamma, \Delta x, \Delta y, \Delta z)$$

If a point on a surface to be approximated by the toric surface is represented by ($x_i$, $y_i$, $z_i$), a square sum of approximated errors is represented by a following function.

$$\Sigma\{z_i - F(x_i, y_i; rx, ry, \alpha, \beta, \gamma, \Delta x, \Delta y, \Delta z)\}^2$$

Next, a combination of the parameters that minimizes the square sum by use of, for example, a dumped least square method, is determined. Thus, the approximation of a surface by a toric surface is attained.

Hereafter, five concrete examples (first to five examples) according to the embodiment will be described. Performance specifications shown in Table 1 are common to all of the following concrete examples. Each of progressive power lenses according to first to third examples and first to third comparative examples is configured such that a front surface is a spherical surface and a back surface is a progressive surface. Each of progressive power lenses according to the fourth example and a fourth comparative example is configured such that front and back surfaces are progressive surfaces. Each of progressive power lenses according to a fifth example and a fifth comparative example is configured such that a front surface is a progressive surface provided with a vertical component of an addition power and that a back surface is a progressive surface provided with a horizontal component of the addition power.

TABLE 1

| Length of progressive power zone | 14.00 [mm] |
|---|---|
| Outer diameter Φ | 70.00 [mm] |
| yf | 8.00 [mm] |
| yn | −14.00 [mm] |
| yt | 35.00 [mm] |
| yu | −35.00 [mm] |

FIRST EXAMPLE

Figure 2:
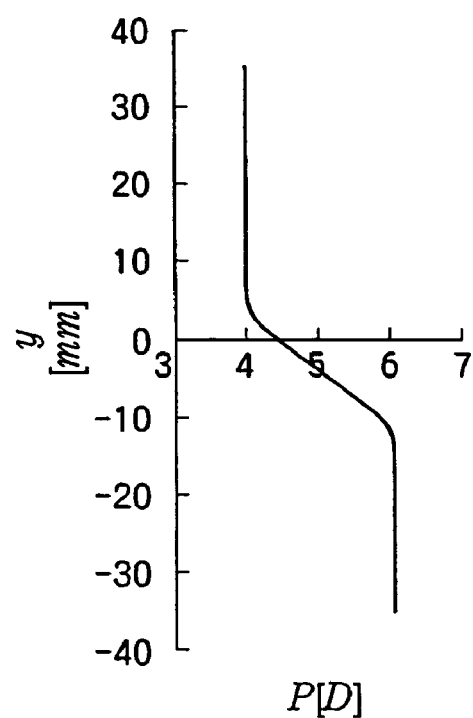
FIG. 2 is a graph illustrating change of a transmission power of a progressive power lens according to a first example.
Figure 3:
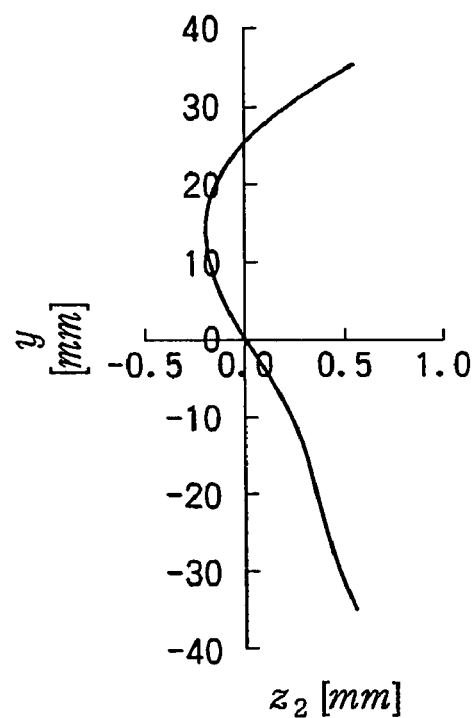
FIG. 3 is a graph illustrating change of a sag amount of a back surface of the progressive power lens according to the first example.
Figure 4:
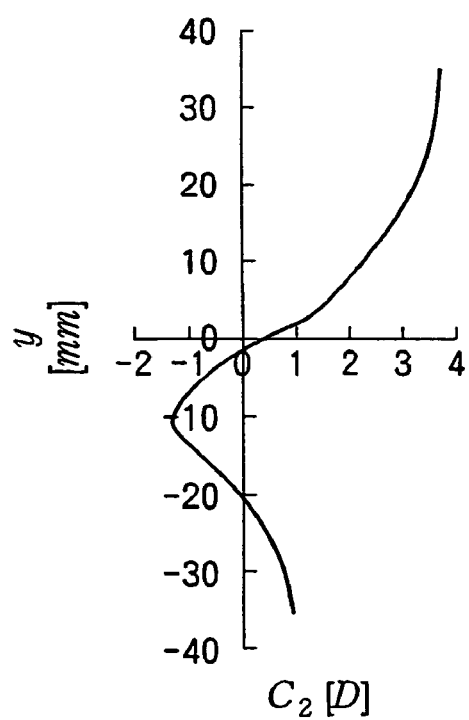
FIG. 4 is a graph illustrating change of a curvature of the back surface of the lens according to the first example along the vertical cross-section.

A progressive power lens according to a first example of the embodiment will be described. The lens according to the first example is also referred to as the lens 10. A vertical cross-section of the lens 10 according to the first example is shown in FIG. 1. FIG. 2 is a graph illustrating change of a transmission power of the lens 10. FIG. 3 is a graph illustrating change of a sag amount z2(y) of the back surface 2 of the lens 10. FIG. 4 is a graph illustrating change of the curvature of the back surface 2 along the vertical cross-section. A numerical configuration of the lens 10 obtained from the graphs of FIGS. 2 to 4 is shown in Table 2.

TABLE 2

| Pf | 4.00 [D] |
|---|---|
| ADD | 2.00 [D] |
| Refractive index | 1.60 |
| D1 | 4.88 [D] |
| C2(yf) | 2.01 [D] |
| C2(yn) | −0.97 [D] |
| z2(yt) | 0.55 [mm] |
| z2(yu) | 0.55 [mm] |
| z2(0) | 0.00 [mm] |

As shown in FIGS. 3 and 4, the back surface 2 has a convex shape portion protruding to an eye side in the vicinity of the near reference point. However, as shown in Table 2, the surface power D1 of the front surface 1 of the lens 10 is 4.88 [D]. Therefore, the lens 10 according to the first example satisfies the condition (1). Also, the lens 10 according to the first example satisfies the conditions (2) to (4).

As can be seen from FIGS. 2 to 4, although a part of the back surface 2 has a convex shape, the entire shape of the lens 10 keeps the meniscus shape. In this example, the protruding amount of the front surface 1 (i.e., a difference between a sag amount of the front surface 1 at a vertex and a sag amount of the front surface 1 at the periphery) is 5.07 mm, and a thickness at a central portion of the lens 10 is 5.53 mm. Therefore, the lens 10 has a considerably reduced thickness.

FIRST COMPARATIVE EXAMPLE

Figure 5:
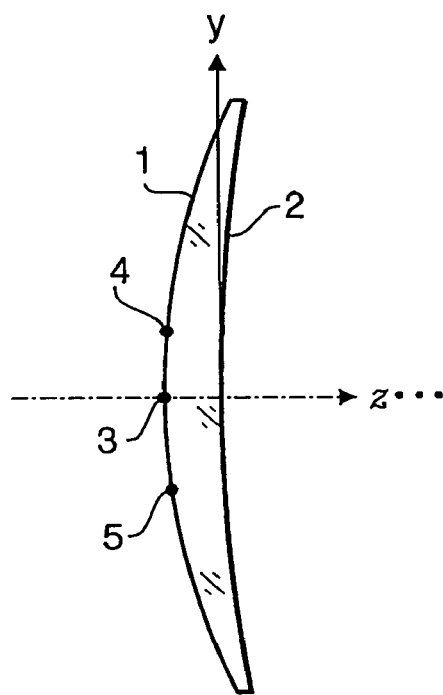
FIG. 5 is a vertical cross-section of a progressive power lens according to a first comparative example.
Figure 6:
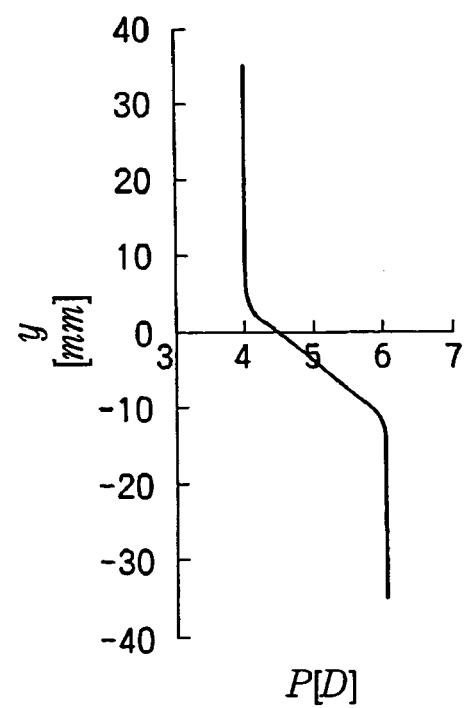
FIG. 6 is a graph illustrating change of a transmission power of the progressive power lens according to the first comparative example.
Figure 7:
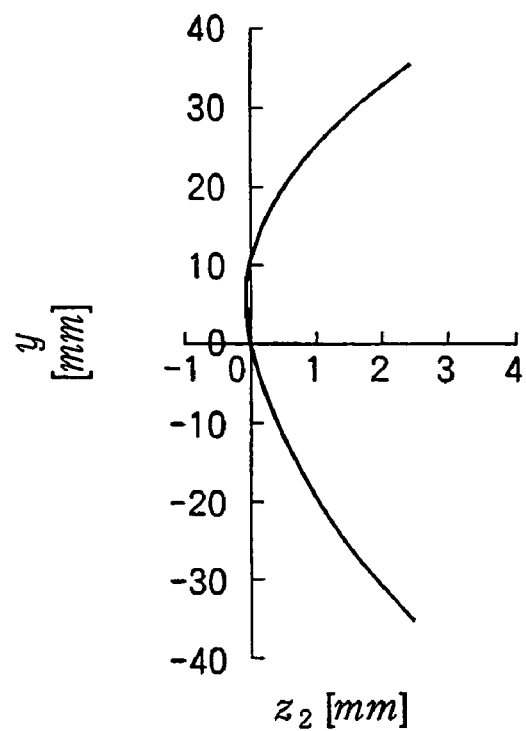
FIG. 7 is a graph illustrating change of a sag amount of a back surface of the progressive power lens according to the first comparative example.
Figure 8:
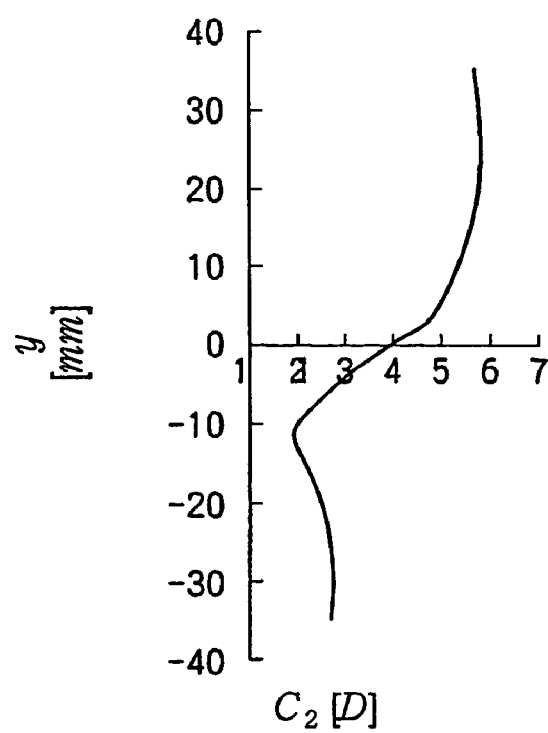
FIG. 8 is a graph illustrating change of a curvature of the back surface of the lens according to the first comparative example along the vertical cross-section.

Hereafter, a first comparative example to be compared with the first example will be described. FIG. 5 shows a vertical cross-section of a progressive power lens according to the first comparative example. In FIG. 5, the same reference numerals as those of the embodiment are used. FIG. 6 is a graph illustrating change of a transmission power of the lens according to the first comparative example. FIG. 7 is a graph illustrating change of a sag amount z2(y) of the back surface 2 of the lens according to the first comparative example. FIG. 8 is a graph illustrating change of the curvature of the back surface 2 of the lens according to the first comparative example along the vertical cross-section. Table 3 shows a numerical configuration of the lens obtained from the graphs of FIGS. 6 to 8.

TABLE 3

| | |
|---|---|
| Pf | 4.00 [D] |
| ADD | 2.00 [D] |
| Refractive index | 1.60 |
| D1 | 6.79 [D] |
| C2(yf) | 5.22 [D] |
| C2(yn) | 2.06 [D] |

As shown in Table 3, the progressive power lens according to the first comparative example has the vertex power of the distance portion Pf, the addition power ADD, and the refractive index respectively equal to the vertex power of the distance portion Pf, the addition power ADD, and the refractive index of the lens 10 according to the first example, while the surface power D1 of the front surface 1 of the lens according to the first comparative example is set to 6.79 [D] as in the case of the document 1 (WO 97/19382).

As shown in Table 3, the curvature C2 at the near reference point of the progressive power lens according to the first comparative example does not satisfy the condition (3). As a result, the protruding amount of the front surface 1 is 7.20 mm, and the thickness at a central portion of the lens is 5.77 mm. That is, the lens according to the first comparative example is considerably thicker than the lens 10 according to the first example although the lens according to the first comparative example keeps the meniscus shape.

SECOND EXAMPLE

Figure 9:
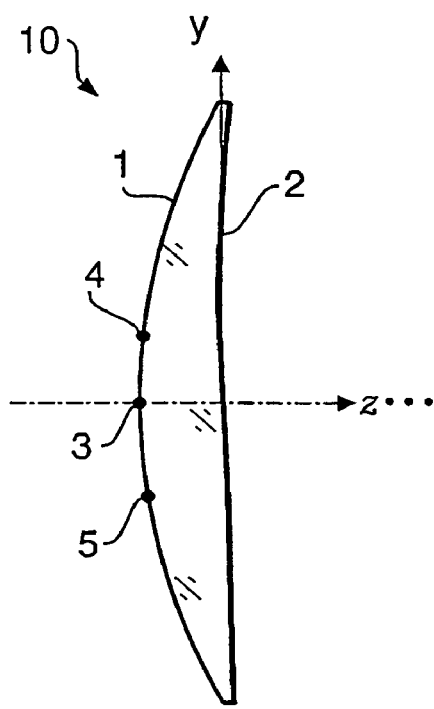
FIG. 9 is a vertical cross-section of a progressive power lens according to a second example.
Figure 10:
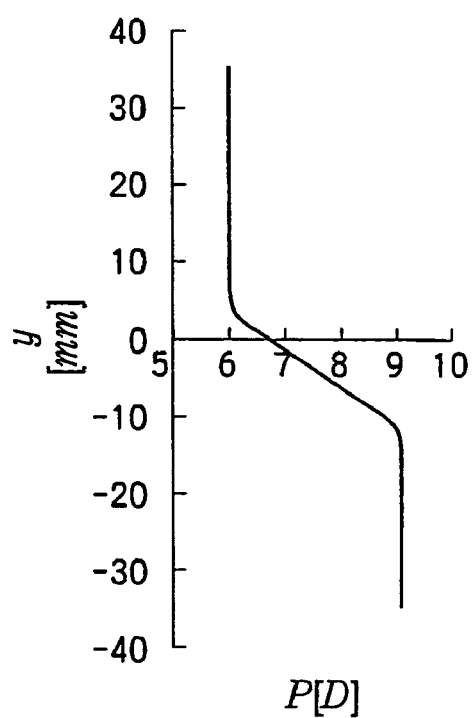
FIG. 10 is a graph illustrating change of a transmission power of the progressive power lens according to the second example.
Figure 11:
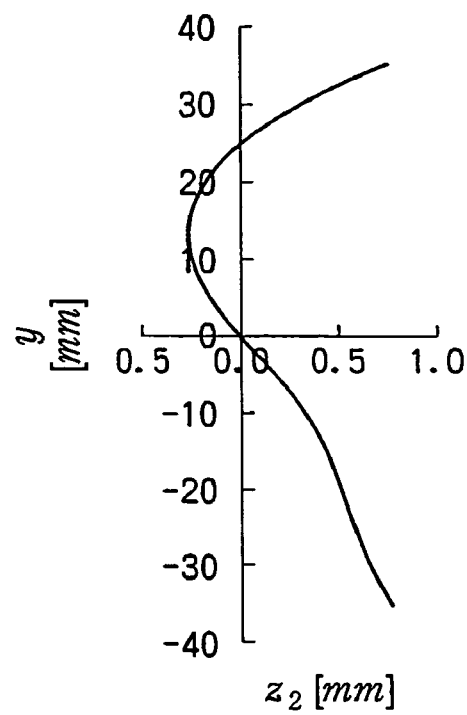
FIG. 11 is a graph illustrating change of a sag amount of a back surface of the progressive power lens according to the second example.
Figure 12:
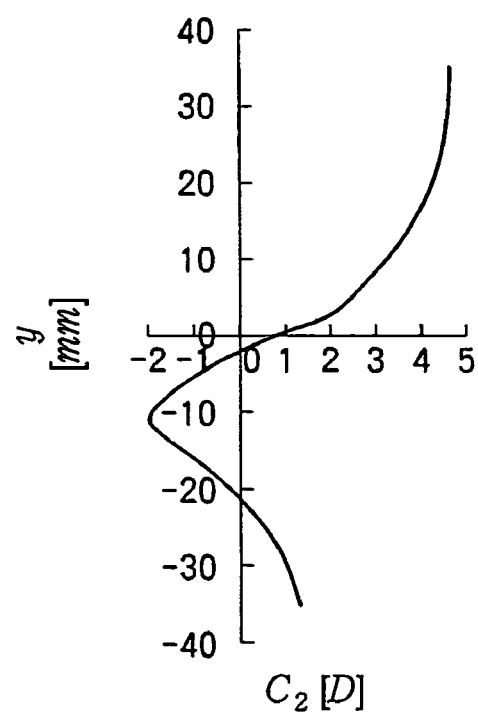
FIG. 12 is a graph illustrating change of a curvature of the back surface of the lens according to the second example along the vertical cross-section.

A progressive power lens according to a second example of the embodiment will be described. The lens according to the second example is also referred to as the lens 10. A vertical cross-section of the lens 10 according to the second example is shown in FIG. 9. FIG. 10 is a graph illustrating change of a transmission power of the lens 10 according to the second example. FIG. 11 is a graph illustrating change of a sag amount z2(y) of the back surface 2 of the lens 10 according to the second example. FIG. 12 is a graph illustrating change of the curvature of the back surface 2 along the vertical cross-section. A numerical configuration of the lens 10 obtained from the graphs of FIGS. 9 to 12 is shown in Table 4.

TABLE 4

| | |
|---|---|
| Pf | 6.00 [D] |
| ADD | 3.00 [D] |
| Refractive index | 1.60 |
| D1 | 7.14 [D] |
| C2(yf) | 2.94 [D] |
| C2(yn) | −1.51 [D] |
| z2(yt) | 0.75 [mm] |
| z2(yu) | 0.75 [mm] |
| z2(0) | 0.00 [mm] |

As shown in FIGS. 11 and 12, the back surface 2 has a convex shape portion protruding to an eye side in the vicinity of the near reference point. However, as shown in Table 4, the surface power D1 of the front surface 1 of the lens 10 is 7.14 [D]. Therefore, the lens 10 according to the second example satisfies the condition (1). Also, the lens 10 according to the second example satisfies the conditions (2) to (4).

As a result, although a part of the back surface 2 has a convex shape, the entire shape of the lens 10 keeps the meniscus shape. In this example, the protruding amount of the front surface 1 is 7.61 mm, and a thickness at a central portion of the lens 10 is 7.86 mm. Therefore, the lens 10 has a considerably reduced thickness.

SECOND COMPARATIVE EXAMPLE

Figure 13:
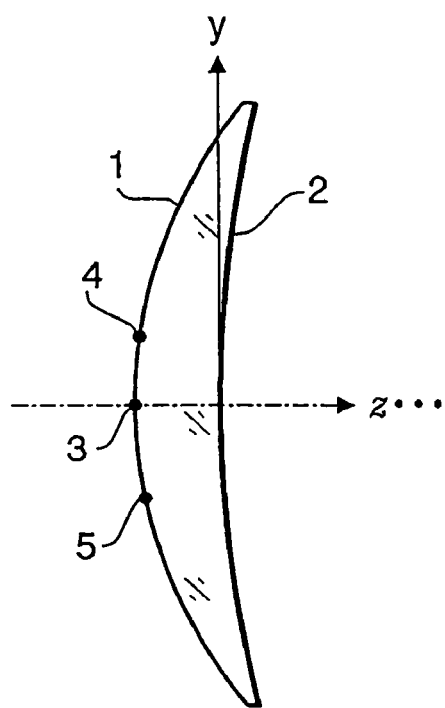
FIG. 13 is a vertical cross-section of a progressive power lens according to a second comparative example.
Figure 14:
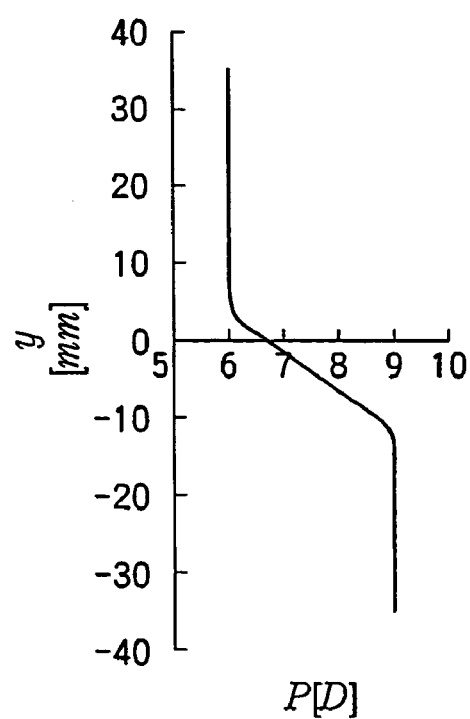
FIG. 14 is a graph illustrating change of a transmission power of the progressive power lens according to the second comparative example.
Figure 15:
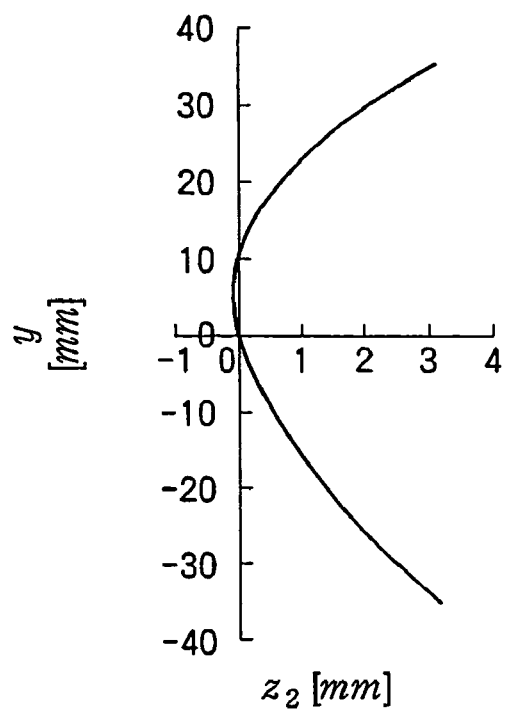
FIG. 15 is a graph illustrating change of a sag amount of a back surface of the progressive power lens according to the second comparative example.
Figure 16:
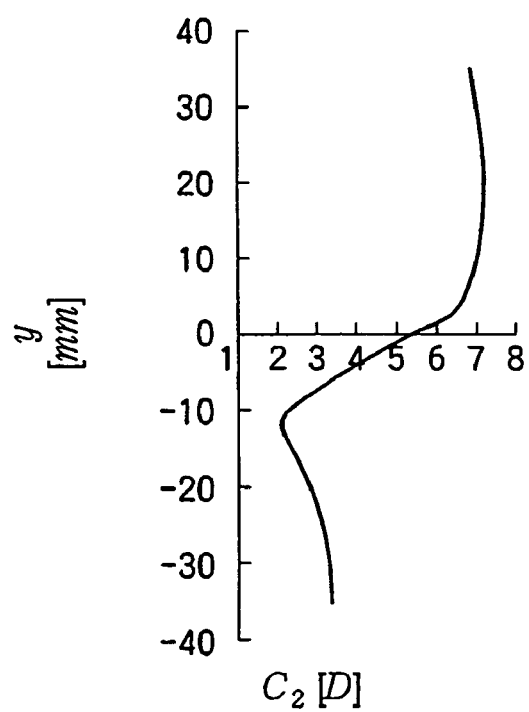
FIG. 16 is a graph illustrating change of a curvature of the back surface of the lens according to the second comparative example along the vertical cross-section.

Hereafter, a second comparative example to be compared with the second example will be described. FIG. 13 shows a vertical cross-section of a progressive power lens according to the second comparative example. In FIG. 13, the same reference numerals as those of the embodiment are used. FIG. 14 is a graph illustrating change of a transmission power of the lens according to the second comparative example. FIG. 15 is a graph illustrating change of a sag amount z2(y) of the back surface 2 of the lens according to the second comparative example. FIG. 16 is a graph illustrating change of the curvature of the back surface 2 of the lens according to the second comparative example along the vertical cross-section. Table 5 shows a numerical configuration of the lens obtained from the graphs of FIGS. 13 to 16.

TABLE 5

| | |
|---|---|
| Pf | 6.00 [D] |
| ADD | 3.00 [D] |
| Refractive index | 1.60 |
| D1 | 9.39 [D] |
| C2(yf) | 6.91 [D] |
| C2(yn) | 2.24 [D] |

As shown in Table 5, the progressive power lens according to the second comparative example has the vertex power of the distance portion Pf, the addition power ADD, and the refractive index respectively equal to the vertex power of the distance portion Pf, the addition power ADD, and the refractive index of the lens 10 according to the second example, while the surface power D1 of the front surface 1 of the lens according to the second comparative example is set to 9.39 [D] as in the case of the document 1 (WO 97/19382).

As shown in Table 5, the curvature C2 at the near reference point of the progressive power lens according to the second comparative example does not satisfy the condition (3). As a result, the protruding amount of the front surface 1 is 10.40 mm, and the thickness at a central portion of the lens is 8.31 mm. That is, the lens according to the second comparative example is considerably thicker than the lens 10 according to the second example although the lens according to the second comparative example keeps the meniscus shape.

THIRD EXAMPLE

Figure 17:
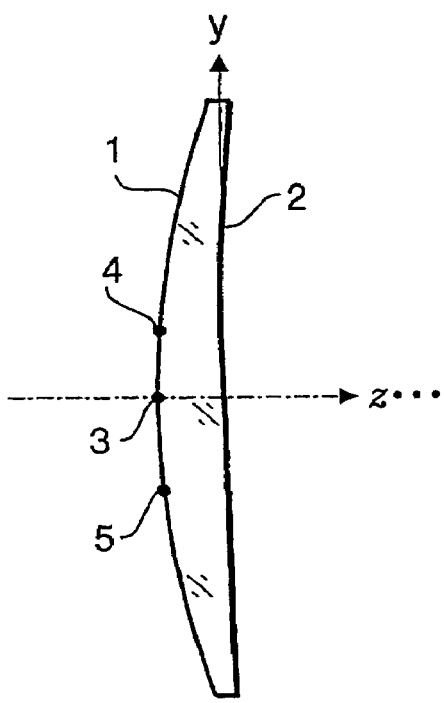
FIG. 17 is a vertical cross-section of a progressive power lens according to a third example.
Figure 18:
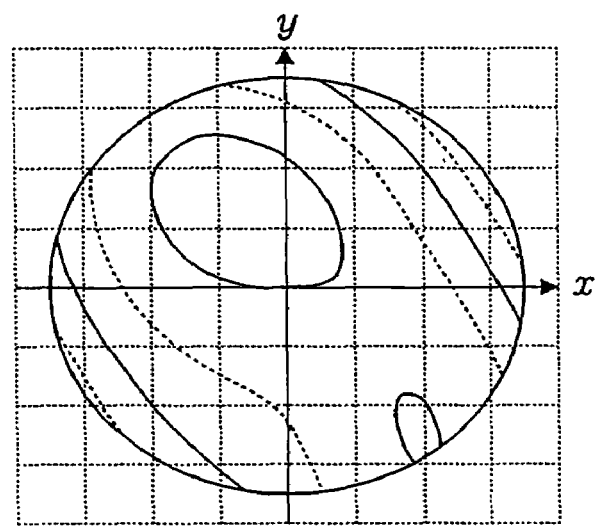
FIG. 18 shows is a contour map representing a surface shape of a back surface of the progressive power lens according to the third example.

A progressive power lens according to a third example of the embodiment will be described. The lens according to the third example is also referred to as the lens 10. The lens 10 according to the third example has a property of correcting astigmatism. A vertical cross-section of the lens 10 according to the third example is shown in FIG. 17. FIG. 18 shows is a contour map representing a surface shape of the back surface 2 by contour lines drawn at intervals of 0.5 mm. In FIG. 18 (and in similar graphs of FIGS. 23, 38 and 44), an x-axis represents an axis which passes through an intersection point of the back surface 2 and the z-axis and is perpendicular to the y-axis and z-axis. That is, the x-axis defined as a horizontal line in a state where a wearer wears the lens.

A minimum curvature C2min, a maximum curvature C2 max and a direction γ of the minimum curvature cross section, which are obtained when the back surface 2 is approximated by a toric surface, are shown in Table 6. As shown in Table 6, the lens 10 according to the third example satisfies the condition (5).

TABLE 6

| C2min | 0.32 [D] |
|---|---|
| C2max | 2.62 [D] |
| γ | 126.00 [deg] |

Figure 19:
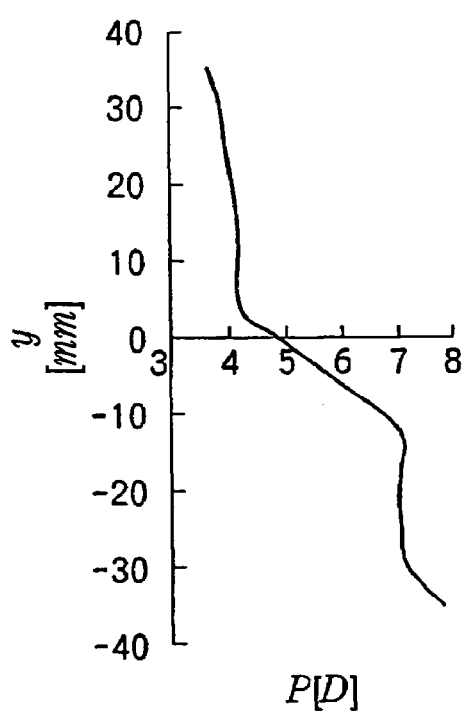
FIG. 19 is a graph illustrating change of a transmission power of the progressive power lens according to the third example.
Figure 20:
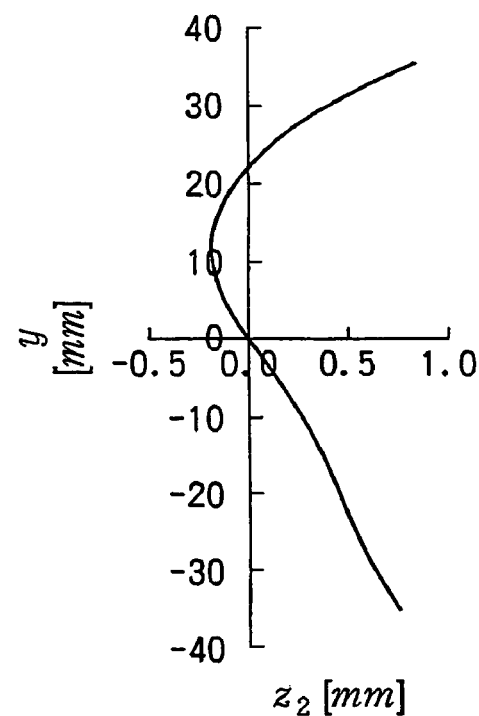
FIG. 20 is a graph illustrating change of a sag amount of the back surface of the progressive power lens according to the third example.
Figure 21:
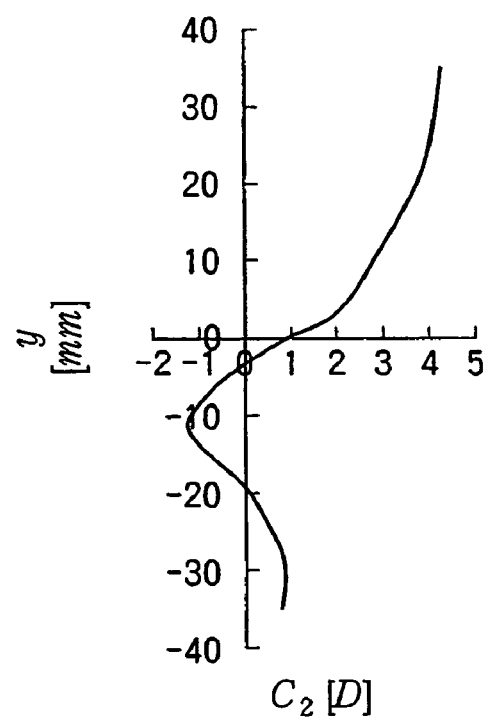
FIG. 21 is a graph illustrating change of a curvature of the back surface of the lens according to the third example along the vertical cross-section.

FIG. 19 is a graph illustrating change of a transmission power of the lens 10 according to the third example. FIG. 20 is a graph illustrating a sag amount z2(y) of the back surface 2 of the lens 10 according to the third example. FIG. 21 is a graph illustrating change of the curvature of the back surface 2 along the vertical cross-section. A numerical configuration of the lens 10 obtained from the graphs of FIGS. 19 to 21 is shown in Table 7. In Table 7, "SOPH" represents a spherical power, "CL" represents a cylindrical power, and "AX" represents a cylinder axis.

TABLE 7

| SPH | 3.00 [D] |
|---|---|
| CYL | 2.00 [D] |
| AX | 45.00 [deg] |
| Pf | 4.00 [D] |
| ADD | 3.00 [D] |
| Refractive index | 1.67 |
| D1 | 5.50 [D] |
| C2(yf) | 2.64 [D] |
| C2(yn) | −1.00 [D] |
| Z2(yt) | 0.83 [mm] |
| Z2(yu) | 0.75 [mm] |
| Z2(0) | 0.00 [mm] |

As shown in FIGS. 20 and 21, the back surface 2 has a convex shape portion protruding to an eye side in the vicinity of the near reference point. The lens 10 according to the third example satisfies the conditions (1) to (4).

As a result, although a part of the back surface 2 has a convex shape, the entire shape of the lens 10 keeps the meniscus shape. In this example, the protruding amount of the front surface 1 is 5.18 mm, and a thickness at a central portion of the lens 10 is 6.16 mm. Therefore, the lens 10 according to the third example has a considerably reduced thickness.

THIRD COMPARATIVE EXAMPLE

Figure 22:
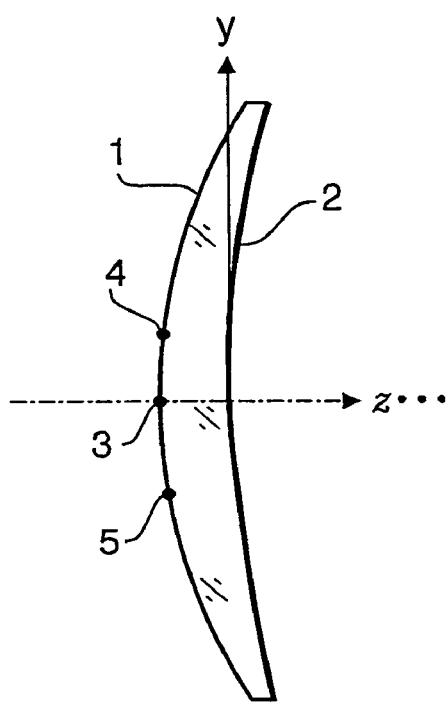
FIG. 22 is a vertical cross-section of a progressive power lens according to a third comparative example.

Hereafter, a third comparative example to be compared with the third example will be described. FIG. 22 shows a vertical cross-section of a progressive power lens according to the third comparative example. In FIG. 22, the same reference numerals as those of the embodiment are used.

Figure 23:
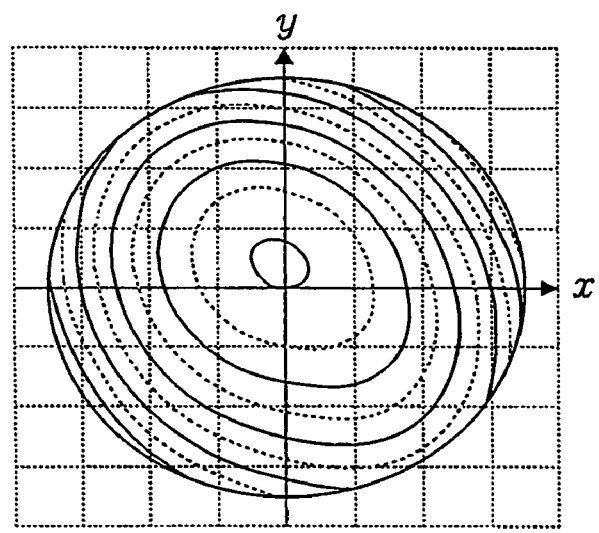
FIG. 23 shows is a contour map representing a surface shape of a back surface of the progressive power lens according to the third comparative example.

FIG. 23 shows is a contour map representing a surface shape of the back surface 2 by contour lines drawn at intervals of 0.5 mm. A minimum curvature C2min, a maximum curvature C2 max and a direction γ of the minimum curvature cross-section, which are obtained when the back surface 2 is approximated by a toric surface, are shown in Table 8.

TABLE 8

| C2min | 4.23 [D] |
|---|---|
| C2max | 6.66 [D] |
| γ | 126.00 [deg] |

As shown in Table 8, minimum curvature C2min of the lens according to the third comparative example exceeds the upper limit of the condition (5). As a result, the protruding amount of the front surface 1 is 8.27 mm, and the thickness at a central portion of the lens is 6.27 mm. That is, the lens according to the third comparative example is considerably thicker than the lens 10 according to the third example although the lens according to the third comparative example keeps the meniscus shape.

Figure 24:
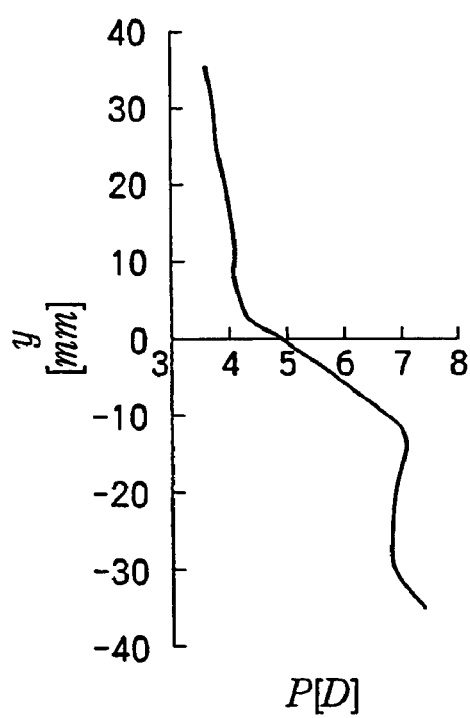
FIG. 24 is a graph illustrating change of a transmission power of the progressive power lens according to the third comparative example.
Figure 25:
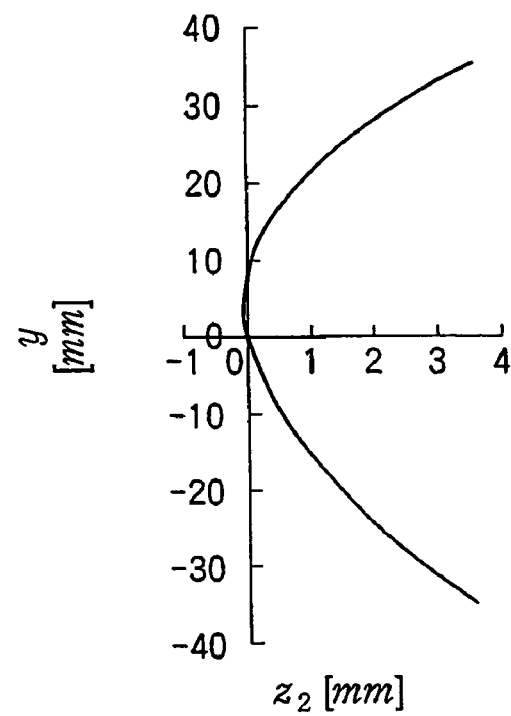
FIG. 25 is a graph illustrating change of a sag amount of the back surface of the progressive power lens according to the third comparative example.
Figure 26:
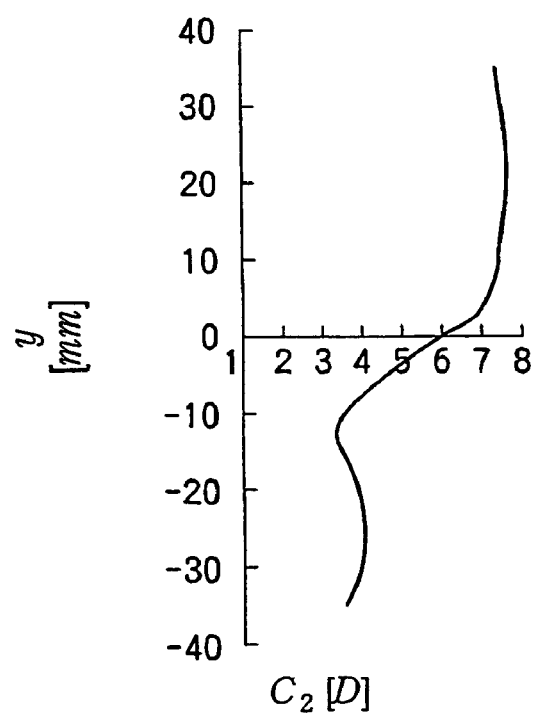
FIG. 26 is a graph illustrating change of a curvature of the back surface of the lens according to the third comparative example along the vertical cross-section.

FIG. 24 is a graph illustrating change of a transmission power of the lens according to the third comparative example. FIG. 25 is a graph illustrating a sag amount z2(y) of the back surface 2 of the lens according to the third comparative example. FIG. 26 is a graph illustrating change of the curvature of the back surface 2 of the lens according to the third comparative example along the vertical cross-section. Table 9 shows a numerical configuration of the lens obtained from the graphs of FIGS. 24 to 26.

TABLE 9

| SPH | 3.00 [D] |
|---|---|
| CYL | 2.00 [D] |
| AX | 45.00 [deg] |
| Pf | 4.00 [D] |
| ADD | 3.00 [D] |
| Refractive index | 1.67 |
| D1 | 8.50 [D] |
| C2(yf) | 7.36 [D] |
| C2(yn) | 3.37 [D] |

As shown in Table 9, the progressive power lens according to the third comparative example has the same spherical power SPH, cylindrical power CL, the vertex power of the distance portion Pf, the addition power ADD, and the refractive index respectively as those of the third example, while the surface power D1 of the front surface 1 of the lens according to the third comparative example is set to 8.50 [D] as in the case of the document 1 (WO 97/19382).

The curvature C2(yn) at the near reference point of the progressive power lens according to the third comparative example does not satisfy the condition (3).

FOURTH EXAMPLE

Figure 27:
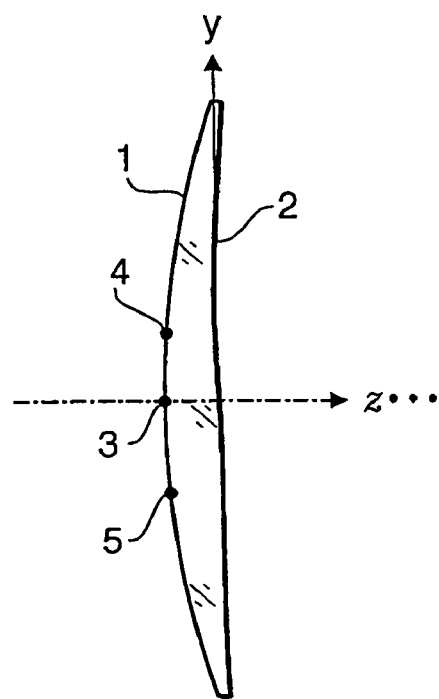
FIG. 27 is a vertical cross-section of a progressive power lens according to a fourth example.

A progressive power lens according to a fourth example of the embodiment will be described. The lens according to the fourth example is also referred to as the lens 10. A vertical cross-section of the lens 10 according to the fouth example is shown in FIG. 27. The lens 10 according to the fourth example is configured such that both of the front and back surfaces are progressive surfaces. In this example, the first half of the addition power is provided by a surface power of the front surface 1, while the second half of the addition power and the correction for aberrations are provided by a progressive surface of the back surface 2.

Figure 28:
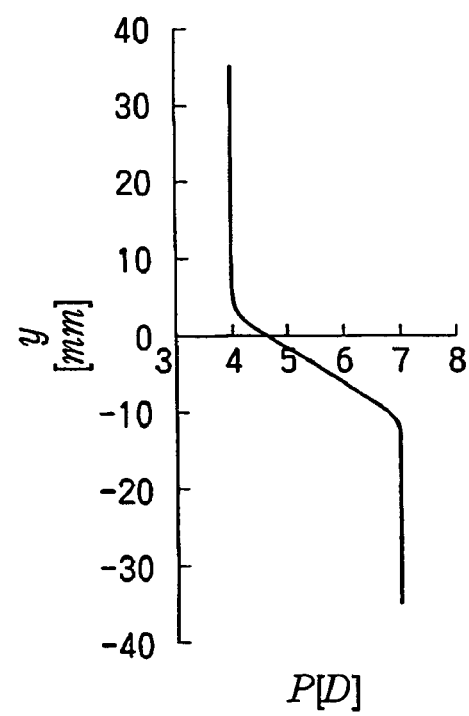
FIG. 28 is a graph illustrating change of a transmission power of the progressive power lens according to the fourth example.
Figure 29:
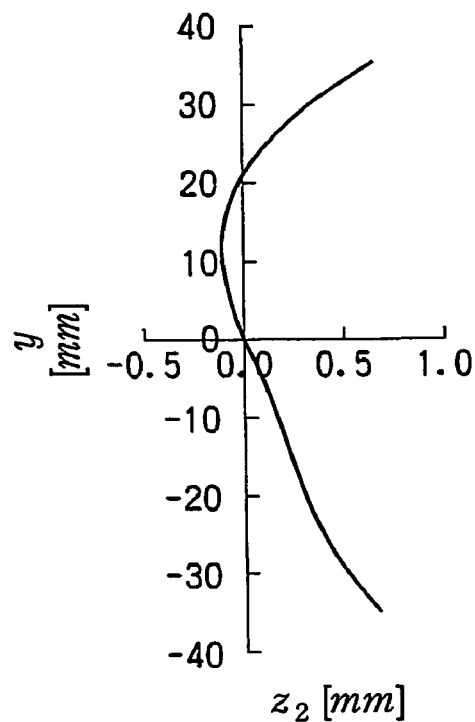
FIG. 29 is a graph illustrating change of a sag amount of the back surface of the progressive power lens according to the fourth example.
Figure 30:
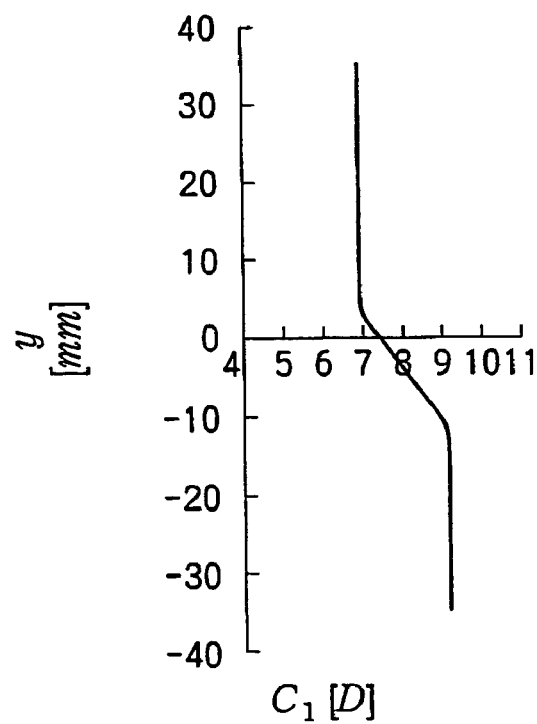
FIG. 30 is a graph illustrating change of a curvature of a front surface of the lens according to the fourth example along the vertical cross-section.
Figure 31:
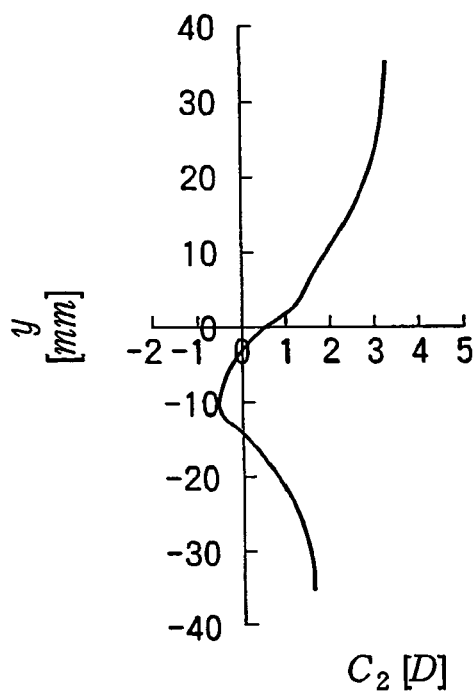
FIG. 31 is a graph illustrating change of a curvature of the back surface of the lens according to the fourth example along the vertical cross-section.

FIG. 28 is a graph illustrating change of a transmission power of the lens 10 according to the fourth example. FIG. 29 is a graph illustrating a sag amount z2(y) of the back surface 2 of the lens 10 according to the fourth example. FIG. 30 is a graph illustrating change of the curvature of the front surface 1 along the vertical cross-section. FIG. 31 is a graph illustrating change of the curvature of the back surface 2 along the vertical cross-section. A numerical configuration of the lens 10 obtained from the graphs of FIGS. 28 to 31 is shown in Table 10.

TABLE 10

| Pf | 4.00 [D] |
|---|---|
| ADD | 3.00 [D] |
| Refractive index | 1.67 |
| D1 | 4.60 [D] |
| C2(yf) | 1.69 [D] |
| C2(yn) | −0.04 [D] |
| z2(yt) | 0.66 [mm] |
| z2(yu) | 0.66 [mm] |
| z2(0) | 0.00 [mm] |

As shown in FIGS. 29 and 31, the back surface 2 has a convex shape portion protruding to an eye side in the vicinity of the near reference point However, as shown in Table 10, the lens 10 according to the fourth example satisfies the conditions (2) to (4).

As a result, although a part of the back surface 2 has a convex shape, the entire shape of the lens 10 keeps the meniscus shape. In this example, the protruding amount of the front surface 1 is 4.88 mm, and a thickness at a central portion of the lens 10 is 5.22 mm. Therefore, the lens 10 according to the fourth example has a considerably reduced thickness.

FOURTH COMPARATIVE EXAMPLE

Figure 32:
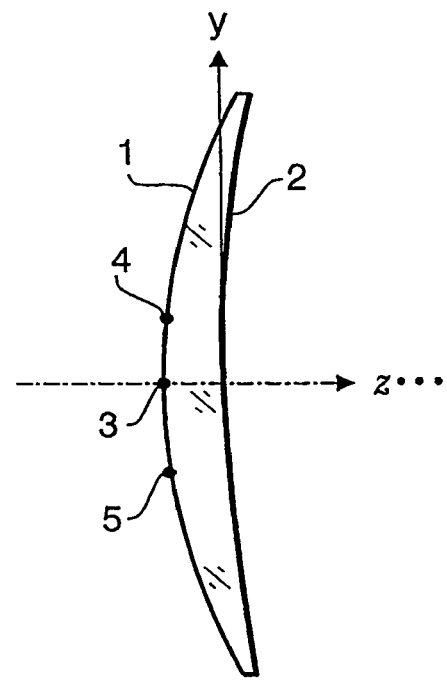
FIG. 32 is a vertical cross-section of a progressive power lens according to a fourth comparative example.
Figure 33:
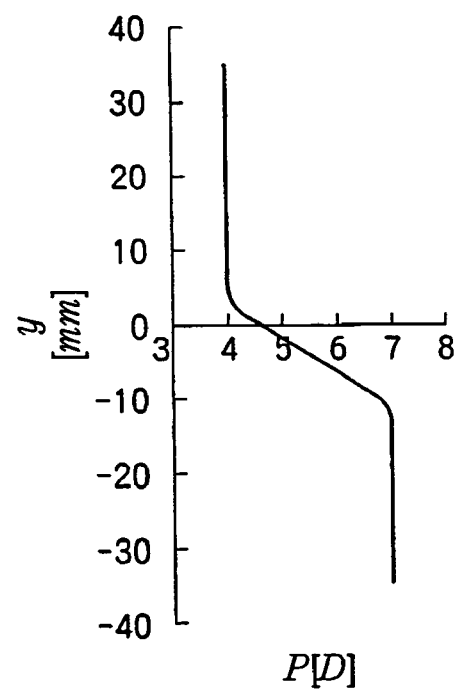
FIG. 33 is a graph illustrating change of a transmission power of the progressive power lens according to the fourth comparative example.
Figure 34:
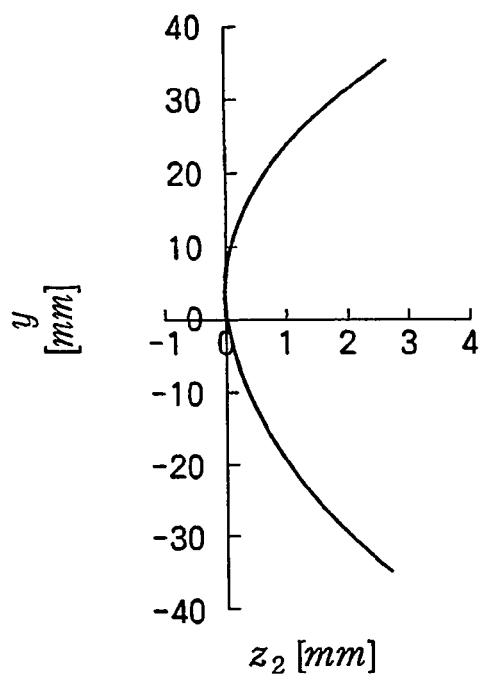
FIG. 34 is a graph illustrating change of a sag amount of the back surface of the progressive power lens according to the fourth comparative example.
Figure 35:
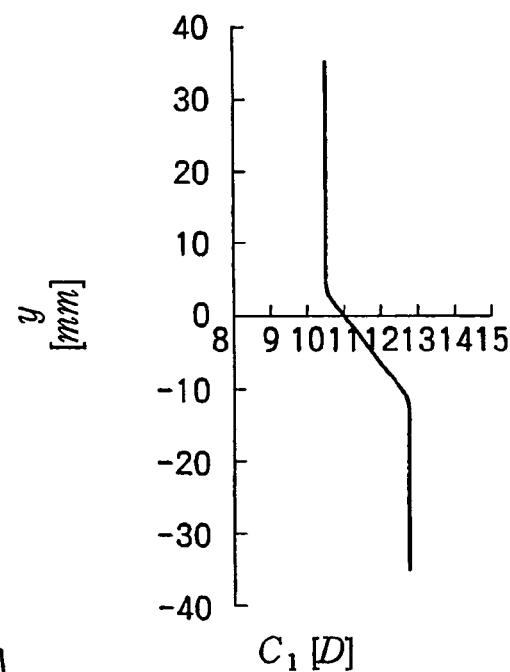
FIG. 35 is a graph illustrating change of a curvature of a front surface of the lens according to the fourth comparative example along the vertical cross-section.
Figure 36:
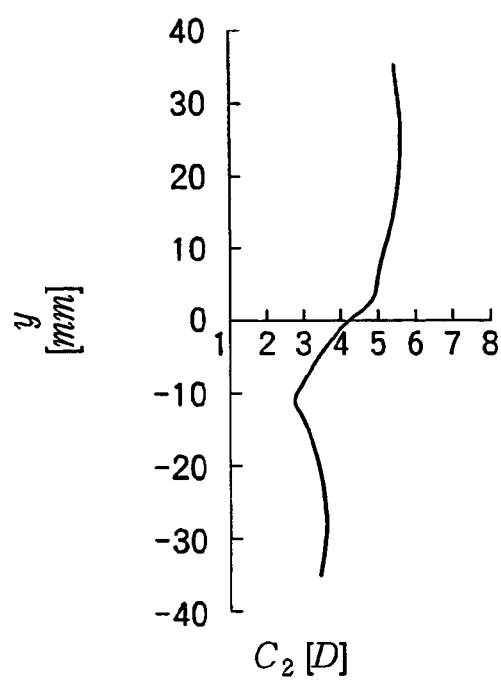
FIG. 36 is a graph illustrating change of a curvature of the back surface of the lens according to the fourth comparative example along the vertical cross-section.

Hereafter, a fourth comparative example to be compared with the fourth example will be described. FIG. 32 shows a vertical cross-section of a progressive power lens according to the fourth comparative example. In FIG. 32, the same reference numerals as those of the embodiment are used. FIG. 33 is a graph illustrating change of a transmission power of the lens according to the fourth comparative example. FIG. 34 is a graph illustrating a sag amount z2(y) of the back surface 2 of the lens according to the fourth comparative example. FIG. 35 is a graph illustrating change of the curvature of the front surface 1 of the lens according to the fourth comparative example along the vertical cross-section. FIG. 36 is a graph illustrating change of the curvature of the back surface 2 of the lens according to the fourth comparative example along the vertical cross-section. Table 11 shows a numerical configuration of the lens obtained from the graphs of FIGS. 33 to 36.

TABLE 11

| Pf | 4.00 [D] |
|---|---|
| ADD | 3.00 [D] |
| Refractive index | 1.67 |
| D1 | 7.00 [D] |
| C2(yf) | 5.12 [D] |
| C2(yn) | 3.04 [D] |
| Z2(yt) | 2.65 [mm] |
| Z2(yu) | 2.65 [mm] |
| Z2(0) | 0.00 [mm] |

As shown in Table 11, the progressive power lens according to the fourth comparative example has the same vertex power of the distance portion Pf, addition power ADD, and refractive index as those of the fourth example, while the surface power D1 of the front surface 1 of the lens according to the fourth comparative example is set to 7.00 [D] as in the case of the document 1 (WO 97/19382).

As shown in Table 11, the curvature C2 at the near reference point of the progressive power lens according to the fourth comparative example does not satisfy the condition (3). As a result, the protruding amount of the front surface 1 is 7.30 mm, and the thickness at a central portion of the lens is 5.65 mm. That is, the lens according to the fourth comparative example is considerably thicker than the lens 10 according to the fourth example although the lens according to the fourth comparative example keeps the meniscus shape.

FIFTH EXAMPLE

A progressive power lens according to a fifth example of the embodiment will be described. The lens according to the fifth example is also referred to as the lens 10. The lens 10 according to the fifth example is configured such that the front surface 1 is a progressive surface to which a vertical component of an addition power is allocated, and the back surface 2 is a progressive surface to which a horizontal component of the addition power is allocated.

Figure 37:
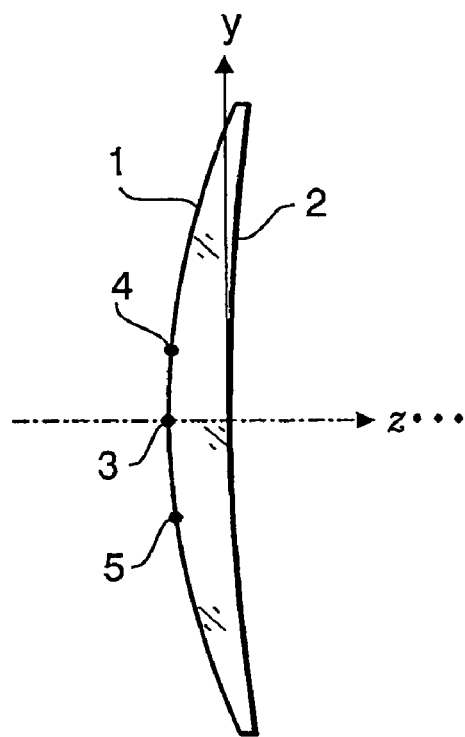
FIG. 37 is a vertical cross-section of a progressive power lens according to a fifth example.
Figure 38:
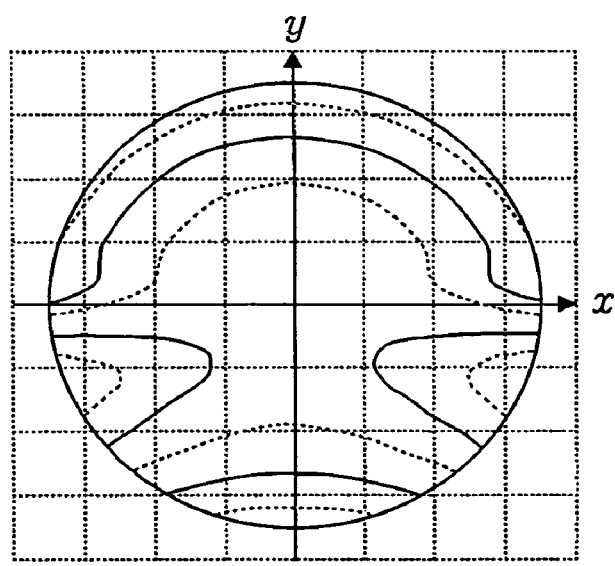
FIG. 38 shows is a contour map representing a surface shape of a back surface of the progressive power lens according to the fifth example.

A vertical cross-section of the lens 10 according to the fifth example is shown in FIG. 37. FIG. 38 is a contour map representing a surface shape of the back surface 2 by contour lines drawn at intervals of 0.5 mm.

A minimum curvature C2min, a maximum curvature C2max and a direction γ of the minimum curvature cross section, which are obtained when the back surface 2 is approximated by a toric surface, are shown in Table 12. As shown in Table 12, the lens 10 according to the fifth example satisfies the condition (5).

TABLE 12

| C2min | 0.49 [D] |
|---|---|
| C2max | 1.82 [D] |
| γ | 0.00 [deg] |

Figure 39:
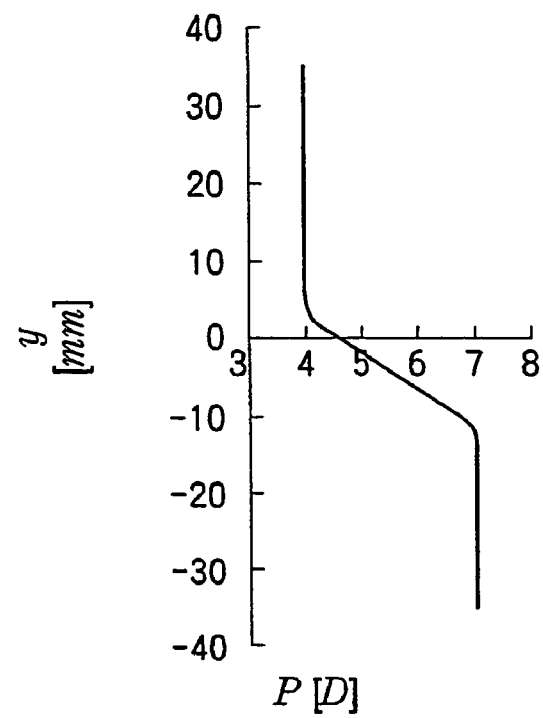
FIG. 39 is a graph illustrating change of a transmission power of the progressive power lens according to the fifth example.
Figure 40:
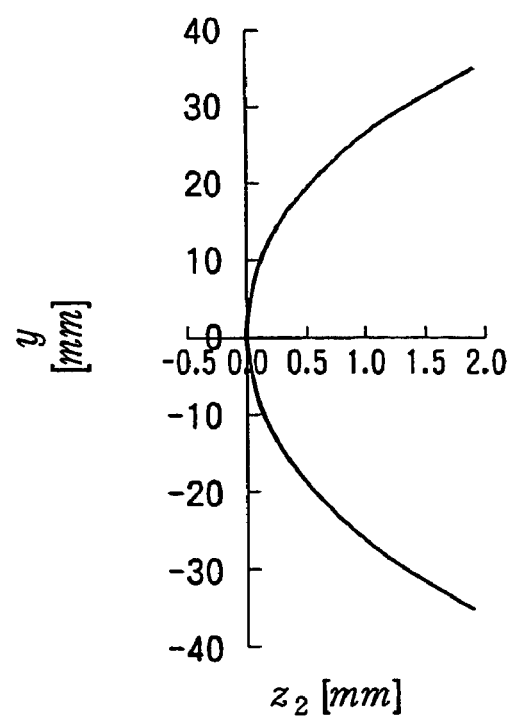
FIG. 40 is a graph illustrating change of a sag amount of the back surface of the progressive power lens according to the fifth example.
Figure 41:
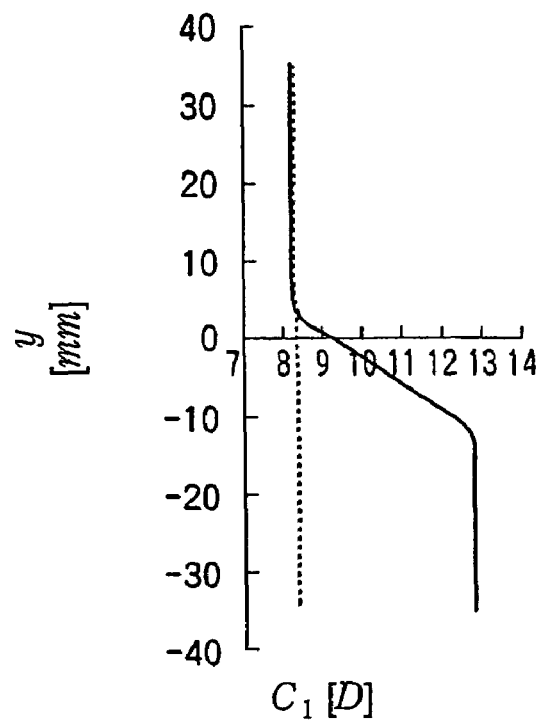
FIG. 41 is a graph illustrating change of a curvature of the front surface of the lens according to the fifth example along a the vertical cross-section, and a sagittal curvature of the front surface.
Figure 42:
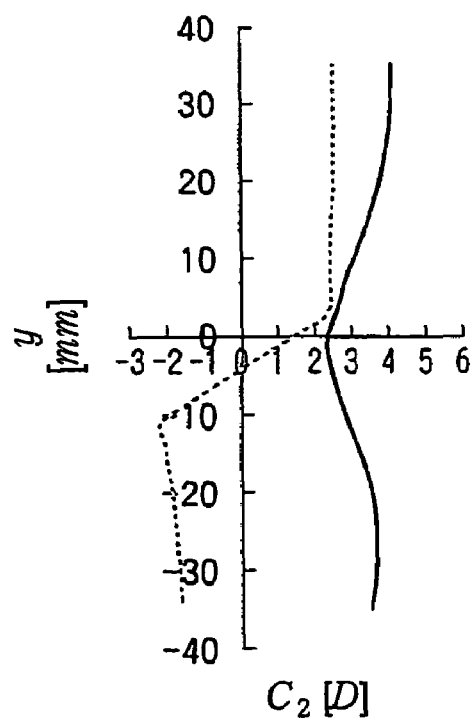
FIG. 42 is a graph illustrating change of a curvature of the back surface of the lens according to the fifth example along the vertical cross-section, and a sagittal curvature of the back surface.

FIG. 39 is a graph illustrating change of a transmission power of the lens 10 according to the fifth example. FIG. 40 is a graph illustrating a sag amount z2(y) of the back surface 2 of the lens 10 according to the fifth example. FIG. 41 is a graph illustrating change of the curvature (represented by a solid line) of the front surface 1 along the vertical cross-section, and the curvature of (represented by a dashed line) of the front surface 1 along a cross-section intersecting perpendicularly with the vertical cross section in the vicinity of the vertical cross-section (hereafter, the curvature of this cross section is referred to as a sagittal curvature). FIG. 42 is a graph illustrating change of the curvature (represented by a solid line) of the back surface 2 along the vertical cross-section, and the sagittal curvature (represented by a dashed line) of the back surface 2.

A numerical configuration of the lens 10 obtained from the graphs of FIGS. 39 to 42 is shown in Table 13. In Table 13, "C2m" represents a curvature along the vertical cross-section, and "C2s" represents the sagittal curvature.

TABLE 13

| | |
|---|---|
| Pf | 4.00 [D] |
| ADD | 3.00 [D] |
| Refractive index | 1.67 |
| D1 | 5.50 [D] |
| C2m(yf) | 2.91 [D] |
| C2m(yn) | 3.18 [D] |
| C2s(yf) | 2.45 [D] |
| C2s(yn) | −2.07 [D] |
| Z2(yt) | 1.89 [D] |
| Z2(yu) | 1.89 [mm] |
| Z2(0) | 0.00 [mm] |

In the case where a lens is designed such that an addition power is divided into vertical and horizontal components as in the case of this example, a vertical cross-section of the lens is not necessarily a minimum curvature cross-section even if the lens is not provided with a cylindrical power.

As shown in FIGS. 40 and 42 and Table 13, the vertical cross-section of the back surface 2 has concave shape portions over the entire region thereof, while the sagittal curvature is smaller than that of the vertical cross-section. Further, as shown in FIG. 42, the sagittal curvature takes negative values in a near portion. However, in this example the entire shape of the lens 10 keeps the meniscus shape by designing the lens 10 to satisfy the condition (5).

In this example, the protruding amount of the front surface 1 is 6.37 mm, and a thickness at a central portion of the lens 10 is 5.48 mm. Therefore, the lens 10 according to the fifth example has a considerably reduced thickness.

FIFTH COMPARATIVE EXAMPLE

Figure 43:
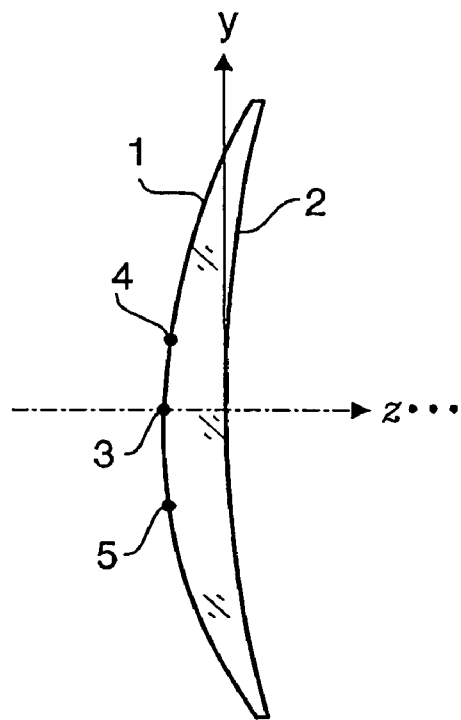
FIG. 43 is a vertical cross-section of a progressive power lens according to a fifth comparative example.

Hereafter, a fifth comparative example to be compared with the fifth example will be described. FIG. 43 shows a vertical cross-section of a progressive power lens according to the fifth comparative example. In FIG. 43, the same reference numerals as those of the embodiment are used.

Figure 44:
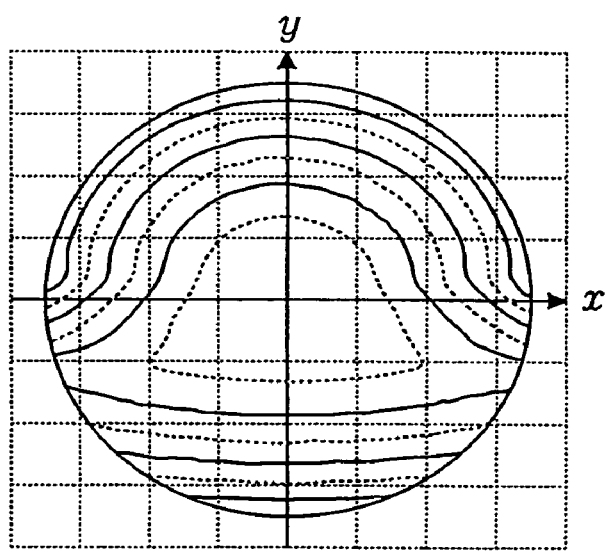
FIG. 44 shows is a contour map representing a surface shape of a back surface of the progressive power lens according to the fifth comparative example.

FIG. 44 shows is a contour map representing a surface shape of the back surface 2 by contour lines drawn at intervals of 0.5 mm. A minimum curvature C2min, a maximum curvature C2 max and a direction γ of the minimum curvature cross section, which are obtained when the back surface 2 is approximated by a toric surface, are shown in Table 14.

TABLE 14

| | |
|---|---|
| C2min | 2.50 [D] |
| C2max | 3.68 [D] |
| γ | 0.00 [deg] |

As shown in Table 14, the minimum curvature C2min of the lens according to the fifth comparative example exceeds the upper limit of the condition (5). As a result, the protruding amount of the front surface 1 is 8.49 mm, and the thickness at a central portion of the lens is 5.89 mm. That is, the lens according to the fifth comparative example is considerably thicker than the lens 10 according to the fifth example although the lens according to the fifth comparative example keeps the meniscus shape.

Figure 45:
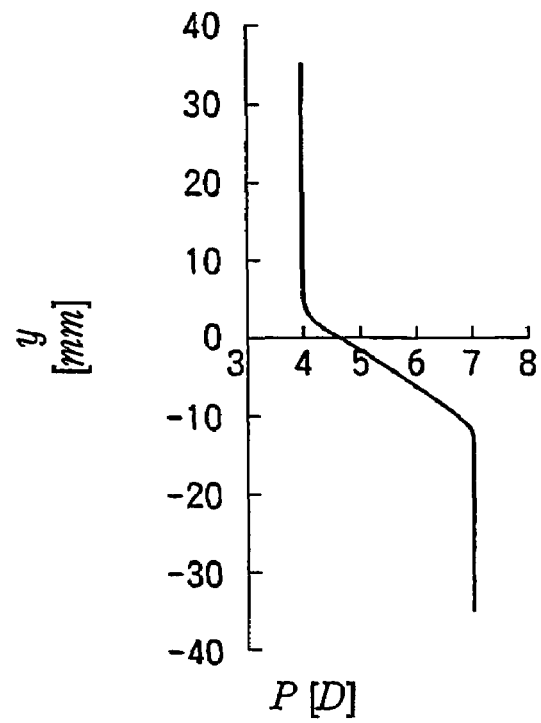
FIG. 45 is a graph illustrating change of a transmission power of the progressive power lens according to the fifth comparative example.
Figure 46:
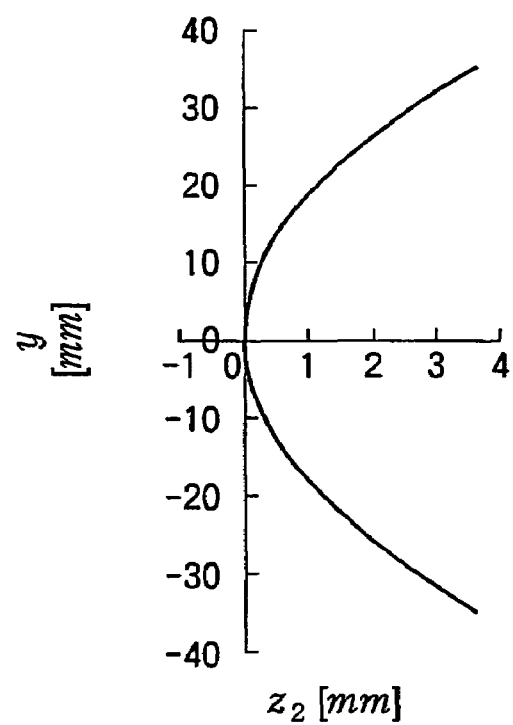
FIG. 46 is a graph illustrating change of a sag amount of the back surface of the progressive power lens according to the fifth comparative example.

FIG. 45 is a graph illustrating change of a transmission power of the lens according to the fifth comparative example. FIG. 46 is a graph illustrating a sag amount z2(y) of the back surface 2 of the lens according to the fifth comparative example. FIG. 47 is a graph illustrating change of the curvature (represented by a solid line) of the front surface 1 along the vertical cross-section, and the sagittal curvature (represented by a dashed line) of the front surface 1. FIG. 48 is a graph illustrating change of the curvature (represented by a solid line) of the back surface 2 along the vertical cross-section, and the sagittal curvature (represented by a dashed line) of the back surface 2.

Table 15 shows a numerical configuration of the lens obtained from the graphs of FIGS. 46 to 48.

TABLE 15

| | |
|---|---|
| Pf | 4.00 [D] |
| ADD | 3.00 [D] |
| Refractive index | 1.67 |
| D1 | 7.50 [D] |
| C2m(yf) | 5.81 [D] |
| C2m(yn) | 5.84 [D] |
| C2s(yf) | 5.51 [D] |
| C2s(yn) | 0.83 [D] |
| Z2(yt) | 8.49 [D] |
| Z2(yu) | 8.49 [mm] |
| Z2(0) | 0.00 [mm] |

As shown in Table 15, the progressive power lens according to the fifth comparative example has the same vertex power of the distance portion Pf, addition power ADD, and refractive index as those of the fifth example, while the surface power D1 of the front surface 1 of the lens according to the fifth comparative example is set to 7.50 [D] as in the case of the document 1 (WO 97/19382).

It is understood that the curvature C2m(yn) and C2s(yn) at the near reference point of the progressive power lens according to the fifth comparative example do not satisfy the condition (3).

What is claimed is:

1. A progressive power lens having a positive vertex power in a distance portion, at least a back surface of the progressive power lens being configured as a progressive surface,
given that an axis normal to a front surface of the progressive power lens at a prism reference point is defined as a z-axis, an axis which passes through an intersection of the z-axis and the back surface in a vertical direction in a state where the progressive power lens is worn by an wearer is defined as an y-axis, a sag amount which is a distance between a point on a curve, defined as an intersection line of the back surface and an y-z plane, at a height y and the y-axis is represented by z2(y), a curvature of the curve at a height y is represented by C2(y), a height of a distance reference point from the z-axis is represented by yf, a height of a near reference point from the z-axis is represented by yn, a height of a top end of the progressive power lens from the z-axis is represented by yt, and a height of a bottom end of the progressive power lens from the z-axis is represented by yu, the progressive power lens satisfying a following conditions:

$$C2(yf) > 0 \tag{2}$$

$$C2(yn) < 0 \tag{3, and}$$

$$z2(yt) + z2(yu) > 2 \cdot z2(0) \tag{4}$$

where a direction headed from the front surface to the back surface is defined as a positive direction of the z-axis, and a direction heading for an upper end of the progressive power lens along the vertical direction in a state where a wearer wears the progressive power lens is defined as a positive direction of the y-axis.

2. A progressive power lens having a positive vertex power in a distance portion, at least a back surface of the progressive power lens being configured as a progressive surface, the progressive power surface being configured such that a minimum one C2min of two principal curvatures obtained when the back surface is approximated by a toric surface satisfies a condition:

$$0 < C2min < 2 \qquad (5).$$

3. The progressive power lens according to claim 2, wherein the back surface has a property of correcting astigmatism.

4. The progressive power lens according to claim 2, wherein the progressive power lens is provided with an addition power in such a manner that distribution of a vertical component of the addition power among front and back surfaces thereof and distribution of a horizontal component of the addition power among the front and back surfaces are separately defined.

5. The progressive power lens according to claim 2, wherein the progressive power lens is provided with an addition power in such a manner that one of vertical and horizontal components of the addition power is allocated to one of front and back surfaces thereof and the other of the vertical and horizontal components of the addition power is allocated to the other of the front and back surfaces.

6. The progressive power lens according to claim 2, wherein the progressive power lens is provided with an addition power in such a manner that each of vertical and horizontal components of the addition power is distributed among front and back surfaces thereof.

* * * * *